(12) United States Patent
Bott

(10) Patent No.: US 10,370,547 B2
(45) Date of Patent: Aug. 6, 2019

(54) OPACIFYING ADDITIVE

(71) Applicant: Wacker Chemical Corporation, Adrian, MI (US)

(72) Inventor: Richard Henry Bott, Macungie, PA (US)

(73) Assignee: Wacker Chemical Corporation, Adrian, MI (US)

(*) Notice: Subject to any disclaimer, the term of this patent is extended or adjusted under 35 U.S.C. 154(b) by 204 days.

(21) Appl. No.: 15/129,552

(22) PCT Filed: Mar. 30, 2015

(86) PCT No.: PCT/US2015/023289
§ 371 (c)(1),
(2) Date: Sep. 27, 2016

(87) PCT Pub. No.: WO2015/153429
PCT Pub. Date: Oct. 8, 2015

(65) Prior Publication Data
US 2017/0174909 A1 Jun. 22, 2017

Related U.S. Application Data

(60) Provisional application No. 61/972,634, filed on Mar. 31, 2014.

(51) Int. Cl.
| | |
|---|---|
| *C09D 7/65* | (2018.01) |
| *C09D 7/40* | (2018.01) |
| *B01J 13/00* | (2006.01) |
| *C08J 3/12* | (2006.01) |
| *D21H 19/42* | (2006.01) |
| *D21H 21/54* | (2006.01) |
| *D21H 19/38* | (2006.01) |
| *C09D 7/61* | (2018.01) |
| *D21H 19/60* | (2006.01) |
| *C09D 5/02* | (2006.01) |
| *C08F 220/18* | (2006.01) |
| *C08L 23/08* | (2006.01) |
| *C08K 3/22* | (2006.01) |

(52) U.S. Cl.
CPC ............ *C09D 7/65* (2018.01); *B01J 13/0021* (2013.01); *B01J 13/0047* (2013.01); *C08J 3/122* (2013.01); *C09D 5/024* (2013.01); *C09D 7/61* (2018.01); *C09D 7/69* (2018.01); *C09D 7/70* (2018.01); *D21H 19/385* (2013.01); *D21H 19/42* (2013.01); *D21H 19/60* (2013.01); *D21H 21/54* (2013.01); *C08F 220/18* (2013.01); *C08J 2331/04* (2013.01); *C08K 2003/2241* (2013.01); *C08L 23/08* (2013.01)

(58) Field of Classification Search
CPC . C09D 7/65; C09D 5/024; C09D 7/61; C09D 7/69; C09D 7/70; C08J 3/122
See application file for complete search history.

(56) References Cited

U.S. PATENT DOCUMENTS

| | | | |
|---|---|---|---|
| 3,950,302 A | 4/1976 | Rauterkus | |
| 4,771,086 A | 9/1988 | Martin | |
| 4,908,391 A * | 3/1990 | Melber | B01J 13/206 521/57 |
| 5,385,960 A | 1/1995 | Emmons | |
| 6,080,802 A | 6/2000 | Emmons | |
| 7,579,081 B2 | 8/2009 | Brown | |
| 2002/0045680 A1* | 4/2002 | Weier | C08F 265/04 523/201 |
| 2008/0098933 A1 | 5/2008 | Killat | |
| 2010/0056668 A1 | 3/2010 | Brown | |

FOREIGN PATENT DOCUMENTS

| | | |
|---|---|---|
| EP | 1510318 | 2/2005 |
| EP | 1916275 | 4/2008 |
| EP | 2426166 | 3/2012 |
| WO | 2006026283 | 3/2006 |
| WO | 2012116025 | 8/2012 |

OTHER PUBLICATIONS

International Search Report and Written Opinion for International Application No. PCT/US2015/023289, dated Mar. 31, 2014, 9 pages.
T.G. Fox, "Influence of Diluent and of Copolymer Composition on the Glass Temperature of a Polymer System", Am. Physics Soc., 1956, vol. 1, No. 3, p. 123.
Brandrup et al., "The Glass Transition Temperatues of Polymer", Polymer Handbook,, 1975, 2nd Edition, J. Wiley & sons, New York, 58 pages.
"Identification to Lignin", 1987, Encyclopedia of Polymer Science and Engineering, vol. 8, John Wiley and Sons, 21 pages.
"A Guidebok To Particle Size Analysis," 32 Pages.

* cited by examiner

*Primary Examiner* — Peter D. Mulcahy
(74) *Attorney, Agent, or Firm* — RatnerPrestia

(57) ABSTRACT

A powdery opacifying additive, comprising a polymer of one or more monomers from the group comprising vinyl esters, (meth)acrylic esters, vinylaromatics, olefins, 1,3 dienes and vinyl halides and, if appropriate, further monomers which are copolymerizable therewith, in the form of agglomerated polymer particles with included air-voids, having a volume mean particle size $d_v$ of 20 to 80 μm.

10 Claims, No Drawings

OPACIFYING ADDITIVE

CROSS REFERENCE TO RELATED APPLICATIONS

This application is a U.S. National Phase Application of PCT International Application PCT/US2015/023289, which claims priority benefit of U.S. provisional patent application No. 61/972,634, filed 31 Mar. 2014, the entirety of which is incorporated herein by reference.

FIELD OF INVENTION

The invention concerns an opacifying additive which imparts improved hiding characteristics into coating compositions, a process for the preparation of an opacifying additive, and a coating composition comprising the opacifying additive.

BACKGROUND

Aqueous polymer dispersions are widely used as binders for coatings or paints. It is often desirable that such coatings or paints have a high hiding capacity to enable the paint to completely conceal the undersurface while utilizing a minimal application of the paint. Titanium dioxide is often the pigment of choice for imparting hiding properties to coating compositions like paints. In paints titanium dioxide is an expensive component in the formulation of the coating composition. Therefore it is an objective to achieve the desired hiding effect in a coating composition while using as little titanium dioxide as possible.

The hiding power of a coating is among others based on light scattering by the surfaces of the pigment particles. The average particle size and particle size distribution of the pigments used for hiding purposes are already highly optimized for maximum scattering by the manufacturers of pigments like titanium dioxide. But light scattering is also a function of the spacing of the titanium dioxide particles in the dried coating. Maximum light scattering is obtained, only if the particles are spaced apart from each other so that there is a minimal interference between the light scattering of neighboring particles. Light scattering can also be optimized via inclusion of certain sizes of air voids within the coating. Often air voids are unintentionally or intentionally part of a coating film due to the relative concentration of pigment and binder or more specifically, the pigment volume concentration of the coating formulation.

In the state of the art a number of techniques have been proposed to improve the hiding powder of coatings with as little titanium dioxide as possible. U.S. Pat. No. 4,771,086 discloses a process wherein nonionic monomers are polymerized in the presence of a nonionic emulsifier and in the presence of $TiO_2$ particles. The naturally agglomerated $TiO_2$ particles are dispersed in situ during polymerization. U.S. Pat. No. 5,385,960 discloses a process comprising the admixture of a dispersion of $TiO_2$ particles with a polymer dispersion of a polymer having dihydrogen phosphate functional groups for a better adsorption of the $TiO_2$ particles. U.S. Pat. No. 6,080,802 describes a further process for obtaining an aqueous polymer dispersion with $TiO_2$ particles which are adsorbed on the surface of the polymer particles.

Adsorption is achieved with polymer latex particles which have the same sign of the surface charge like the $TiO_2$ particles. In the process of U.S. Pat. No. 7,579,081 a first polymer is attached to the pigment particles via a silane residue. In the presence of the thus obtained particles a monomer emulsion is polymerized forming an envelope around the particles obtained in the first step.

A similar process is disclosed in US 2010/0056668 A1, which describes a process comprising dispersing pigment particles in an aqueous medium with aminophosphorus acid-functional first polymer, and performing an emulsion polymerization in the presence of the dispersed pigment particles. In the thus obtained product the dispersed pigment particles are encapsulated by the second polymer.

In the process disclosed in WO 2012/116025 A1 a polymerization is performed in an aqueous dispersion comprising $TiO_2$ particles, an amphoteric polymer and sodium styrene sulfonate. The product is an aqueous dispersion of $TiO_2$ particles which are encapsulated with the polymer.

In EP 2 426 166 A2 an aqueous composition is described comprising $TiO_2$ particles which are adsorbed on emulsion polymer particles with phosphoric acid monomer units.

All of these techniques of the state of the art have the same inherent problem of polymer dispersions containing high proportions of pigment, namely colloidal stability. Although it is known to disperse and chemically or physically couple a pigment in a polymer dispersion to enhance the dispersion of the pigment, this approach is severely limited by the need to maintain the colloidal stability of the resulting product. Pigments are typically of much higher density than polymers and thus cannot easily be colloidally stabilized resulting in handling issues related to a slurry. In addition the improvement of the hiding power of pigment particles by an holospheric approach which means enveloping the pigment particles with a polymer shell is limited in the capacity of creating voids between the polymer particles. In addition mostly hard polymers with a high $T_g$ are used which have very low binding capability.

SUMMARY

It was therefore the object of the present invention to find a way for improving the hiding power of a coating composition, and which eliminates the problem of long term colloidal stability of aqueous pigment composition.

In one aspect, the invention provides a coating composition, comprising a polymer dispersion, a pigment, and a filler and comprising a powdery opacifying additive in an amount of 1 to 30% by weight, based on the dryweight of the polymer applied with the polymer dispersion, characterized in that the powdery opacifying additive comprises a polymer of one or more monomers from the group comprising vinyl esters, (meth)acrylic esters, vinylaromatics, olefins, 1,3 dienes and vinyl halides and, if appropriate, further monomers which are copolymerizable therewith, which is in the form of agglomerated polymer particles with included air-voids, having a volume mean particle size $d_v$ of 20 to 80 μm.

Suitable polymers for the opacifying additive are polymers of one or more monomers from the group comprising vinyl esters, (meth)acrylic esters, vinylaromatics, olefins, 1,3 dienes and vinyl halides and, if appropriate, further monomers which are copolymerizable therewith.

The additive according to the invention provides improved hiding efficiency to pigments and polymers in coating compositions. The inventive additive further provides ease of handling due to its solid dry powder form, enabling coating formulators to easily adjust coating performance without the need for special handling techniques or equipment required for liquid slurries or low active content dispersions. Further features and advantages will be apparent in the detailed description that follows.

DETAILED DESCRIPTION

Suitable vinyl esters are vinyl esters of carboxylic acids having from 1 to 12 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 11 carbon atoms, for example VeoVa9® or VeoVa10®. Vinyl acetate is particularly preferred.

Suitable monomers from the group consisting of acrylic esters and methacrylic esters are esters of unbranched or branched alcohols having from 1 to 15 carbon atoms. Preferred methacrylic esters and acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Preferred vinyl aromatics are styrene, methylstyrene and vinyltoluene. A preferred vinyl halide is vinyl chloride. Preferred olefins are ethylene, propylene and preferred dienes are 1,3-butadiene and isoprene.

Particularly preferred are vinyl acetate ethylene copolymers comprising vinyl acetate units in an amount of 70 to 98 wt %, based on the total weight of comonomers. Preferably the vinyl acetate content is in the range of 75 to 95 wt %, most preferred the vinyl acetate content is in the range of 80 to 95 wt %, in each case based on the total weight of comonomers. The vinyl acetate-ethylene copolymers comprise ethylene in an amount of 2 to 30 wt %, based on the total weight of comonomers. The amount is preferably 5 to 15 wt %, most preferred 10 to 12 wt %, in each case based on the total weight of comonomers. Most preferred copolymers are those of ethylene and vinyl acetate without further comonomers.

Nonetheless, in some embodiments the vinyl acetate ethylene copolymers may include up to 30 wt %, preferably up to 10 wt %, in each case based on the total weight of comonomers, of other non-functional monomer units selected from the group consisting of vinyl chloride, (meth) acrylic acid esters and vinyl esters other than vinyl acetate. Such non-functional monomers may be introduced for example to adjust glass transition temperature or hydrophobicity.

In some embodiments, in the polymers, and especially in the particularly preferred vinyl acetate ethylene copolymers, auxiliary monomers (functional monomers) may be copolymerized in an amount up to 10 wt %, preferably 0.05 to 10 wt %, in each case based on the total weight of comonomers. Examples of auxiliary monomers are: ethylenically unsaturated monocarboxylic and dicarboxylic acids; ethylenically unsaturated carboxamides and carbonitriles; monoesters and diesters of fumaric acid and maleic acid; ethylenically unsaturated sulphonic acids and their salts; silane functional monomers; and glycidyl functional monomers. Such auxiliary monomers may for example improve dispersion stability.

Further examples of auxiliary monomers are crosslink-forming functional comonomers. Examples for precrosslinking comonomers are polyethylenically unsaturated comonomers. Examples of postcrosslinking comonomers are acrylamidoglycolic acid (AGA), methylacrylamidoglycolic acid methyl ester (MAGME), N-methylolacrylamide (NMA), N-methylolmethacrylamide (NMMA). Also suitable as auxiliary monomers are ethylenically unsaturated, hydrolyzable silicon compounds. Further examples for auxiliary monomers are ethylenically unsaturated compounds containing epoxide groups and ethylenically unsaturated monomers intended to improve coating performance such as alkyl acrylates and vinyl esters of lauric or versatic acids.

The monomers are preferably selected so as to give polymers b) with a glass transition temperature $T_g$ of −30° C. to +30° C., preferably −5° C. to 20° C., and most preferred 0° C. to 18° C. The glass transition temperature $T_g$ of the copolymers may be determined in a known manner by means of differential scanning calorimetry (DSC) according to ASTM D3418. The $T_g$ may also be calculated approximately in advance by means of the Fox equation. According to Fox T. G., Bull. Am. Physics Soc. 1, 3, page 123 (1956), it holds that: $1/T_g = x_1/T_{g1} + x_2/T_{g2} + \ldots + x_n/T_{gn}$, where $x_n$ is the mass fraction (wt %/100) of the monomer n and $T_{gn}$ is the glass transition temperature, in kelvins, of the homopolymer of the monomer n. $T_g$ values for homopolymers are listed in the Polymer Handbook, 2nd Edition, J. Wiley & Sons, New York (1975).

The polymer can be prepared by an aqueous emulsion polymerization using conventional emulsion polymerization procedure. Such a procedure is described for many times and known to a skilled person, for example in Encyclopedia of Polymer Science and Engineering, Vol. 8 (1987), John Wiley and Sons, pages 659 to 677 or for example in EP 1 916 275 A1.

Polymerization temperature is preferably at a temperature in a range from 40° C. to 150° C. If gaseous comonomers like ethylene are used, the polymerization pressure is generally between 40 and 100 bar abs. Polymerization may be initiated using a redox initiator combination such as is customary for an aqueous emulsion polymerization. Regulating substances may be used during the polymerization to control the molecular weight of the copolymer. Emulsifiers and/or protective colloids are used to stabilize the aqueous dispersion of the polymer b) during polymerization. The solids content of the thus obtained polymer dispersions is typically in a range from 45% to 75 wt %.

For obtaining the powdery opacifying additive the aqueous polymer dispersion obtained, has to be dried, preferably by spray-drying. The viscosity of the aqueous polymer dispersion to be spray-dried is adjusted via the solids content so as to give a figure of <500 mPas (Brookfield viscosity, spindle 5, at 20 rpm and 23° C.), preferably <250 mPas. The solids content of the aqueous admixture to be spray-dried is >35%, preferably >40%.

In the next step the aqueous polymer dispersion is spray-dried. Spray drying in this case takes place in customary spray-drying systems, where the atomization may take place by means of one-fluid, two-fluid or multi-fluid nozzles or with a rotating disk. Hot air is used for drying usually with an entrance temperature of 130° C. to 210° C. The exit temperature of the air is generally in the range from 45° C. to 120° C., preferably 60° C. to 90° C. In contrast to the common preparation of water-redispersible polymer powders the spray-drying is performed without addition of a polyvinyl alcohol or polyvinyl alcohol-derivative drying-aid.

The spray-drying is performed without addition of conventional polyvinyl alcohol or polyvinyl alcohol-derivative drying-aids, such as partly or fully hydrolyzed polyvinyl alcohols. Other drying aids include, for example, hydroxyethylcellulose, starch, and other water-soluble colloidal materials. Suitable colloidal materials include, for example, polyvinyl acetals, polyvinylpyrrolidones, polysaccharides in water-soluble form, such as starches (amylose and amylopectin), celluloses and the carboxymethyl, methyl, hydroxyethyl, hydroxypropyl derivatives thereof, dextrins and cyclodextrins, proteins such as casein or caseinate, soya protein, and gelatin, lignosulfonates, synthetic polymers such as poly(meth)acrylic acid, copolymers of (meth)acrylates with carboxy-functional comonomer units, poly(meth)acrylamide, polyvinylsulfonic acids, and the water soluble copolymers thereof, melamine-formaldehydesulfonates, naphthalene-formaldehydesulfonates, styrene-maleic acid, and vinyl ether-maleic acid copolymers. In a preferred embodiment, the spray-drying is performed without the addition of any drying-aid.

The product obtained is an agglomerate of primary polymer particles with air voids included in the agglomerate. Because of the absence of a drying aid these particles do not disintegrate after being dispersed in water. Therefore the particles maintain this morphology after addition to an aqueous coating composition and the hiding is improved because of light scattering on this agglomerates.

The agglomerated polymer particles with included air-voids, have a volume mean particle size $d_v$ of 20 to 100 μm, preferably 40 to 80 μm, in each case measured in an aqueous dispersion with 10% by weight of polymer, by laser diffraction with a Beckman Coulter LS instrument.

The opacifying additive can be used in the application sectors typical therefore, for example as an opacifying additive in emulsion paints, e.g. masonry paints or interior paints. A typical application is also paper coating. The opacifying additive is usually added in an amount of 1 to 30% by weight, preferably 5 to 25% by weight, based on the dry weight of the polymer applied with the polymer dispersion. The formulations for such paints are known to the skilled person, and generally include 5% to 50% by weight of an aqueous polymer dispersion, 5% to 35% by weight of water, 5% to 80% by weight of filler, 5% to 30% by weight of pigments, and also 0.1% to 10% by weight of further additives, the figures in % by weight in the formulation adding up to 100% by weight.

Examples of fillers which can be used are carbonates such as calcium carbonate in the form of calcite, chalk, and marble, and also magnesium calcium carbonate in the form of dolomite. Other examples are silicates, such as magnesium silicate in the form of talc, or aluminum silicates such as loam and clays; finely ground quartz, quartz sand, highly disperse silica, and feldspar. Also suitable are fiber fillers.

While for use in paints titanium oxide pigments are mostly used, suitable pigments include preferably titanium dioxide, zinc oxide, antimony oxide, zirconium oxide, chromium oxide, iron oxide. More preferably the pigments are selected from rutile titanium dioxide and anatase titanium dioxide. Most preferably the pigment particles are rutile titanium dioxide.

Examples of further additives are wetting agents in fractions of generally 0.1% to 0.5% by weight, based on the overall weight of the formulation. Examples thereof are sodium and potassium polyphosphates, polyacrylic acids and salts thereof. Additives also include thickeners, which are used generally in an amount of 0.01% to 2.0% by weight, based on the overall weight of the formulation. Customary thickeners are cellulose ethers, starches, or bentonite as an example of an inorganic thickener. Further additives are preservatives, defoamers, freeze-thaw stabilizers.

For producing the coating materials, the copolymer dispersion is mixed and homogenized with the pigment composition, other formulation ingredients like the opacifying additive, filler, and further adjuvants in suitable mixers. When pasty materials are being produced, it is common first to introduce the water fraction, to add the dispersion, and, lastly, to incorporate the solids with stirring.

The pigment-volume concentration (PVC) of pigmented coating materials such as emulsion paints is situated generally within the range from 10% to 90% and is calculated in line with the following formula:

PCV (%)=(VP+$F$×100)/(VP+$F$+VB)

where VP+F=sum of volume of pigment and filler, VB=volume of binder. At a PVC≥50%, coating materials are termed highly filled.

Examples and comparison examples for demonstration of invention and for demonstration of inventive step Preparation of Additive Example 1

An aqueous dispersion of a vinyl acetate ethylene copolymer with a $T_g$ of the copolymer of 18° C. and with a solids content of the dispersion of 58% was diluted with water for obtaining a Brookfield-viscosity of 180 mPas. The thus obtained dispersion was spray-dried with hot air having an entrance temperature of 135° C. and an exit temperature of 80° C., without the addition of a drying-aid.

After re-dispersion of the thus obtained powder in water, with a concentration of 10% by weight, the dispersed copolymer particles had a volume mean particle size $d_v$ of 42 μm.

Comparison Example 2

An aqueous dispersion of a vinyl acetate ethylene copolymer with a $T_g$ of the copolymer of 18° C. and with a solids content of the dispersion of 58% was admixed with 9% by weight, based on the dry weight of the copolymer, of polyvinyl alcohol as a spraying-aid. The polyvinyl alcohol had a degree of hydrolysis of 88 mol % and a Hoeppler viscosity of 4 mPas (in 4% aqueous solution, method according to Hoeppler at 20° C., DIN 53015. The mixture was diluted with water for obtaining a Brookfield-viscosity of 180 mPas. The thus obtained dispersion was spray-dried with hot air having an entrance temperature of 135° C. and an exit temperature of 80° C.

After re-dispersion of the thus obtained powder in water, with a concentration of 10% by weight, the dispersed copolymer particles had a volume mean particle size $d_v$ of 2.5 μm.

Comparison Example 3

Ropaque™ Ultra E, a hollow-sphere polymeric pigment, a dry hiding additive of Dow Chemical Company.

Testing of Paints:

For testing the following paint formulation with a PVK of 73% was prepared:

| Constituent | Weight |
|---|---|
| Binder dispersion Vinnapas$^R$ EP 3355 (VAE copolymer dispersion 55%) | 88 |
| Additive | 22 |
| Titanium dioxide pigment (Kronos 2300) | 100 |
| Calcium carbonate (Omyacarb 2GU) | 70 |

-continued

| Constituent | Weight |
| --- | --- |
| Calcium carbonate (Omyacarb 5GU) | 70 |
| Magnesium silicate (Talkum N) | 80 |
| Dolomite (Microdol 1) | 50 |
| Calcium carbonate, precipitated (Socal P2) | 70 |
| Defoamer (Agitan 260) | 9 |
| Celluose ether (Tylose H 6000 YP) | 6 |
| Dispersant (Dispex N 40) | 5 |
| Dispersant (Calgon N) | 5 |
| Preservative (Hydrol W) | 1 |
| Sodium hydroxide (10%) | 1 |
| Water | 423 |
| Sum of all parts by weight | 1000 |

Paint formulations comprising the additives of example 1, comparison example 2 and comparison example 3 were tested, and paint viscosity, hiding efficiency and scrub resistance were determined. The results of this testing are summarized below:

Test results:

| Additive | Example 1 | Comp. Ex. 2 | Comp. Ex. 3 |
| --- | --- | --- | --- |
| Paint viscosity (mPas) | 13320 | 13820 | 17440 |
| Hiding effect (98% contrast ratio in m$^2$/l) | 11.2 | 9.9 | 9.9 |
| Scrub (µm) | 9.6 | 12.5 | 11.3 |

The test results show a better hiding effect of the opacifying additive (example 1) in comparison with a conventional hiding additive (Comp. ex. 3). This effect is not to be obtained with polymer powders dried in the presence of a drying aid (comp. ex. 2).

Surprisingly, in addition to better hiding, the opacifying additive imparts also a much better scrub resistance into the paint.

Test Methods:

Determination of Volume Average Particle Size $d_v$:

The median value of the volume average particle size was determined by static light scattering measurement (laser diffraction) using the LS13320 particle size measuring instrument from BeckmanCoulter™ according to the instructions in the user manual.

Paint Viscosity (mPas):

The viscosity of the paint was measured with a Brookfield viscosimeter at a temperature of 23° C., at 20 rpm, and using spindle 5.

Hiding (m$_2$/l):

The hiding efficiency was determined with the method described in "Richtlinie zur Bestimmung des Deckvermögens" of "Verband der deutschen Lackindustrie"

The paint formulation was applied with an automatic film applicator, with a doctor blade with a gap height of 150 microns and 200 microns, in each case on black-white contrast cards (type 3H of the company Lenetta) with standard color value Y over black of 7 or less, and standard color value Y over white of 80 to 90. The coated contrast cards were weighed, and "Ergiebigkeit" (yield) in "m$^2$/l" was calculated from the density of paint and from the quantity of paint applied.

According to DIN ISO 6504-3, the thus coated contrast maps were dried for 24 hours at 23° C. and 50%) relative humidity. With a colorimeter (Micro Flash 4.0 V from Data-color) the "Normfarbwerte" Y (color standards) were measured over the black and the white base and the "Kontrastverhältnis" (contrast ratio) in "%" was calculated.

The values for the Kontrastverhältnis thus determined was drawn against the corresponding Ergiebigkeit in a chart. By interpolation the "Ergiebigkeit" in m$^2$/l at a "Kontrastverhältnis" of 98% was determined. The higher the "Ergiebigkeit", the better is the hiding effect.

Scrub (µm):

The scrub (wet abrasion resistance) was tested by means of the abrasive pad method (ISO 11998). This was done by determining the erosion of the coating after 200 scrub cycles, via the loss of mass by the paint film. From the paint density, the scuffed area, and the loss of mass of the paint film, a calculation was made of the paint erosion (wet abrasion) in µm.

What is claimed is:

1. A coating composition, comprising a polymer dispersion, a pigment, and a filler and comprising a powdery opacifying additive in an amount of 1 to 30% by weight, based on the dry weight of the polymer applied with the polymer dispersion, wherein the powdery opacifying additive comprises a polymer of one or more monomers selected from the group consisting of vinyl esters, (meth)acrylic esters, vinylaromatics, olefins, 1,3 dienes and vinyl halides and, if appropriate, further monomers which are copolymerizable therewith, in the form of agglomerated polymer particles with included air-voids, having a volume mean particle size $d_v$ of 20 to 80 µm.

2. The coating composition of claim 1, wherein the powdery opacifying additive comprises a vinyl acetate ethylene copolymer with 70-98% by weight vinyl acetate and 2 to 30% by weight ethylene.

3. The coating composition of claim 1, wherein the powdery opacifying additive is prepared with a process comprising the steps of spray-drying, without the addition of a drying-aid, an aqueous dispersion of a polymer of one or more monomers from the group comprising vinyl esters, (meth)acrylic esters, vinylaromatics, olefins, 1,3 dienes and vinyl halides and optionally further monomers which are copolymerizable therewith, to form agglomerated polymer particles with included air-voids, having a volume mean particle size $d_v$ of 20 to 80 µm.

4. The coating composition of claim 3, prepared with a process comprising spray-drying of an aqueous dispersion of a vinyl acetate ethylene copolymer with 70-98% by weight vinyl acetate and 2 to 30% by weight ethylene.

5. The coating composition of claim 1, wherein the pigment comprises at least partly titanium dioxide.

6. A paint comprising the coating composition of claim 1.

7. A paper coating comprising the coating composition of claim 1.

8. The coating composition of claim 2, wherein the pigment comprises at least partly titanium dioxide.

9. A paint comprising the coating composition of claim 8.

10. A paper coating comprising the coating composition of claim 8.

* * * * *